United States Patent
Saruwatari

(10) Patent No.: US 12,358,589 B2
(45) Date of Patent: Jul. 15, 2025

(54) SYSTEM FOR ELECTRIC MOTOR-ASSISTED BICYCLE, AND ELECTRICAL COMPONENT FOR ELECTRIC MOTOR-ASSISTED BICYCLE

(71) Applicant: YAMAHA HATSUDOKI KABUSHIKI KAISHA, Iwata (JP)

(72) Inventor: Yutaka Saruwatari, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 849 days.

(21) Appl. No.: 17/579,858

(22) Filed: Jan. 20, 2022

(65) Prior Publication Data

US 2022/0242520 A1 Aug. 4, 2022

(30) Foreign Application Priority Data

Feb. 2, 2021 (JP) .................................. 2021-015239

(51) Int. Cl.
  *B60L 3/00* (2019.01)
  *B62M 6/45* (2010.01)
  *B62M 6/55* (2010.01)
  *B62M 6/90* (2010.01)

(52) U.S. Cl.
  CPC .................. *B62M 6/45* (2013.01); *B60L 3/00* (2013.01); *B62M 6/55* (2013.01); *B62M 6/90* (2013.01)

(58) Field of Classification Search
  CPC .. B62M 6/45; B62M 6/55; B62M 6/90; B60L 3/00; B62J 43/30; B62J 43/13
  See application file for complete search history.

(56) References Cited

U.S. PATENT DOCUMENTS

| | | | |
|---|---|---|---|
| 10,407,125 B2 | 9/2019 | Ohashi et al. | |
| 2005/0098979 A1 | 5/2005 | Horiuchi | |
| 2006/0001233 A1 | 1/2006 | Horiuchi | |
| 2006/0038377 A1 | 2/2006 | Horiuchi | |
| 2014/0035356 A1 | 2/2014 | Watarai et al. | |
| 2016/0297499 A1* | 10/2016 | Ohashi .................. | B60K 35/00 |

(Continued)

FOREIGN PATENT DOCUMENTS

| | | | |
|---|---|---|---|
| CN | 205989792 U | 3/2017 | |
| DE | 202019104797 U1 * | 1/2021 | .............. B62M 6/90 |
| JP | H08268376 A | 10/1996 | |

(Continued)

OTHER PUBLICATIONS

Official Communication issued in corresponding Japanese Patent Application No. 2021-015239, mailed on Oct. 8, 2024, 2 pages.

*Primary Examiner* — Calvin Cheung

(74) *Attorney, Agent, or Firm* — Keating & Bennett, LLP

(57) ABSTRACT

A system for an electric motor-assisted bicycle includes a driver including a motor driven by electric power from a battery to generate an assist force, and an electrical component connected to the driver to receive a supply of power from the driver for operation. The electrical component includes a power input to receive power output from the driver, an outbound power output terminal to supply some of the power received by the power input to an outside of the electrical component, and an outbound supply power controller to control an upper limit of power to be supplied to the outside through the outbound power output terminal based on an amount of power suppliable by the driver.

7 Claims, 6 Drawing Sheets

(56) References Cited

U.S. PATENT DOCUMENTS

2018/0257741 A1\* 9/2018 Saruwatari ............... B62M 6/50

FOREIGN PATENT DOCUMENTS

| JP | 2005-138827 A | 6/2005 |
| JP | 2016199084 A | 12/2016 |
| JP | 2017103942 A | 6/2017 |
| JP | 2017147927 A | 8/2017 |
| JP | 2018177186 A | 11/2018 |

\* cited by examiner

SYSTEM FOR ELECTRIC MOTOR-ASSISTED BICYCLE, AND ELECTRICAL COMPONENT FOR ELECTRIC MOTOR-ASSISTED BICYCLE

CROSS-REFERENCE TO RELATED APPLICATION

This application is based upon and claims the benefit of priority to Japanese Patent Application No. 2021-015239, filed on Feb. 2, 2021, the entire contents of which are hereby incorporated herein by reference.

BACKGROUND OF THE INVENTION

1. Field of the Invention

The present invention relates to a system for an electric motor-assisted bicycle, and an electrical component.

2. Description of the Related Art

The number of bicycles with handlebars with an electronic device, such as cycle computer, mounted thereon has increased in recent years. For example, JP 2005-138827 A describes mounting various electronic control parts on the handlebars of a bicycle.

SUMMARY OF THE INVENTION

A system for an electric motor-assisted bicycle according to a preferred embodiment of the present invention includes a driver including a motor to be driven by electric power from a battery to generate an assist force, and an electrical component connected to the driver and using electric power from the driver for operation. The electrical component includes a power input to receive electric power output from the driver, an outbound power output terminal to supply some of the electric power received by the power input to an outside of the electrical component, and an outbound supply power controller configured or programmed to control an upper limit of electric power to be supplied to the outside through the outbound power output terminal based on an amount of electric power suppliable by the driver.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
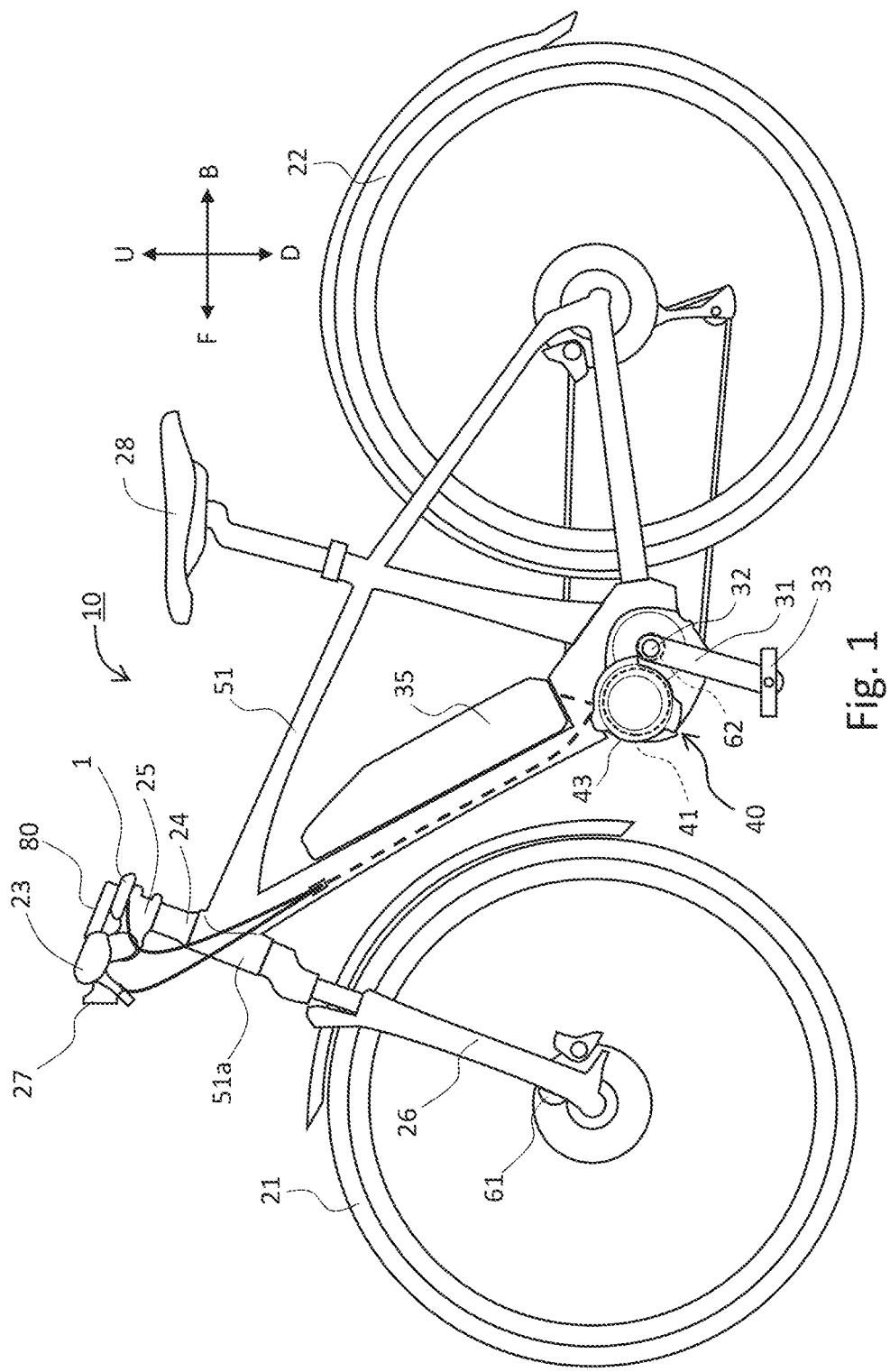
FIG. 1 is a left side view of an electric motor-assisted bicycle according to a preferred embodiment of the present invention.

The inventor of preferred embodiments of the present invention investigated arrangements in an electric motor-assisted bicycle that enable supply of electric power to an external electrical component, such as a cycle computer, from a battery mounted on the bicycle. If additional cables for power supply are to be provided on the battery, routing of cables becomes complicated. In view of this, it is preferable to use electric power routes that already exist. The inventor examined arrangements in which an electrical component that is supplied with electric power from the battery supplies electric power to the outside. Specifically, electric power from the battery of an electric motor-assisted bicycle is supplied to a driver including a motor. The driver supplies an electrical component (e.g., a display that indicates the state of assistance, or rider operation device relating to assistance) with electric power. In such arrangements, an external electronic device is supplied with electric power via the electrical component that is in turn supplied with power by the driver.

During the research, the inventor assumed that various combinations of drivers and electrical components are possible. In such cases, the amount of electric power suppliable by the driver and electrical component varies depending on the combination of a driver and an electrical component. The inventor discovered that, in such cases, some combinations do not allow the maximum use of the amount of electric power suppliable by the driver and the electrical component.

In view of this, preferred embodiments of the present invention provide systems for electric motor-assisted bicycles and electrical components that each enable supply of electric power from the electrical components to the outside using the power supply capacities of the drivers and the electrical components in an efficient manner.

Preferred embodiments of the present invention enable the supply of electric power from the electrical component of an electric motor-assisted bicycle to the outside using the power supply capacities of the driver and the electrical component in an efficient manner. Electric power is the rate of electric energy. Electric power can be expressed by using the unit of W (watt).

The inventor investigated arrangements in a system for an electric motor-assisted bicycle including a battery, a driver, and an electrical component in which the electrical component supplies electric power to the outside. Supply of electric power to the outside is not a main function of the driver nor of the electrical component. The driver and the electrical component need to provide other functions than outbound power supply. Various types of drivers and electrical components are expected to be used depending on various requirements. That is, a plurality of types (i.e., device types) of drivers and electrical components are expected to be used depending on the intended use. Different types of drivers and electrical components have different power supply capacities. For example, drivers required to offer space saving benefits have small power supply capacities.

The inventor assumed that a system allowing a free combination of electrical device functions with driver properties would be preferable. Allowing a free combination of types of electrical components and drivers can increase the variations of the vehicles. If various combinations of types of electrical components and drivers are possible, the power supply capacities of an electrical component and a driver may not necessarily match. For some combinations, situations are expected where an amount of electric power exceeding the maximum power supply capacity of one of the driver and the electrical component is to be supplied to the outside. To avoid this, the amount of outbound supply power may be adjusted based on that combination which has the lowest power supply capacity; in such cases, however, a given power supply capacity may not be fully exploited.

In view of this, the inventor arrived at an arrangement where an electrical component that is supplied with electric power by a driver for operation controls the amount of electric power to be supplied to the outside based on the amount of electric power suppliable by that particular driver. In this way, with combinations of various drivers and electrical components with different power supply capacities, a given power supply capacity can be efficiently used to supply electric power from the electrical component to the outside. The preferred embodiments described below are based on this discovery.

A system for an electric motor-assisted bicycle according to a preferred embodiment of the present invention includes a driver including a motor to be driven by electric power from a battery to generate an assist force, and an electrical component connected to the driver and using electric power from the driver for operation. The electrical component includes a power input to receive electric power output from the driver, an outbound power output terminal to supply some of the electric power received by the power input to an outside of the electrical component, and an outbound supply power controller configured or programmed to control an upper limit of electric power to be supplied to the outside through the outbound power output terminal based on an amount of electric power suppliable by the driver.

In the above-described arrangement, the electrical component controls the upper limit of electric power to be supplied to the outside based on the amount of electric power suppliable by the source of electric power, i.e., the driver. Thus, regardless of which one of various drivers with different power supply capacities is connected to the electrical component, the upper limit of electric power to be supplied to the outside is able to be changed depending on the amount of power suppliable by that particular driver. This will enable efficient use of the power supply capacities of the driver and the electrical component to supply electric power from the electrical component to the outside.

The outbound supply power controller may be configured or programmed to further control the upper limit of electric power to be supplied to the outside based on a power consumption of the electrical component. This will enable appropriate control of the upper limit of outbound supply power depending on both the amount of power suppliable by the driver and the power consumption of the electrical component.

The outbound supply power controller may be configured or programmed to further control the upper limit of electric power to be supplied to the outside based on a predetermined amount of electric power suppliable by the electrical component. This will enable appropriate control of the upper limit of outbound supply power depending on both the amount of power that can be supplied by the driver and a predetermined amount of power that can supplied by the electrical component.

The outbound supply power controller may select, as the upper limit of electric power to be supplied through the outbound power output terminal to the outside, the lower one of an amount of power based on the amount of power suppliable by the driver and the predetermined amount of power suppliable by the electrical component.

The outbound supply power controller may select, as the upper limit of electric power to be supplied through the outbound power output terminal to the outside, the amount obtained by subtracting the power consumption of the electrical component from the amount of power suppliable by the driver. The value of power consumption used to determine an upper limit of electric power may depend on the operating condition of the electrical component, for example. For example, a value of power consumption may be determined based on the electric current and/or voltage measured in the electrical component. Alternatively, the value of power consumption may be changed depending on the operation of the electrical component. The value of power consumption may take account of power losses that occur in the path of transmission. The value of loss may be, for example, stored on the electrical component in advance, or may be obtained from the driver through communication, or a value may be determined based on the operation of the electrical component.

The outbound supply power controller may control the upper limit of electric power to be supplied to the outside based on at least three factors, more specifically, the amount of electric power suppliable by the driver, the predetermined amount of electric power suppliable by the electrical component, and the power consumption of the electrical component.

By way of example, the outbound supply power controller may select, as the upper limit of power to be supplied through the outbound power output terminal to the outside, the lower one of the amount obtained by subtracting the power consumption of the electrical component from the amount of power suppliable by the driver, and the predetermined amount of power suppliable by the electrical component.

The outbound supply power controller may include, for example, an upper limit determiner to determine an upper limit of electric power to be supplied through the outbound power output terminal to the outside at least depending on the amount of power suppliable by the driver, and a power supply to supply electric power through the outbound power output terminal to the outside without exceeding the upper limit determined by the upper limit determiner.

The electrical component may include a driver communicator to communicate with the driver. The outbound supply power controller is able to control the upper limit of electric power to be supplied to the outside based on the amount of electric power suppliable by the driver acquired via the driver communicator. Such communication facilitates acquisition of new information regarding the amount of power suppliable by the driver. This will enable more appropriate adjustment of the upper limit of power to be supplied to the outside depending on the amount of power that can be supplied by the driver. Such acquisition of information about the amount of power suppliable by the driver is not limited to communication. For example, the amount of power suppliable by the driver may be indicated by information indicative of the amount of power suppliable by the driver, the information provided by, for example, initial settings made when the electrical component is connected to the driver and stored on the electrical component.

The outbound supply power controller may include an upper limit determiner to determine an upper limit of electric power to be supplied through the outbound power output terminal to the outside based on the amount of electric power suppliable by the driver, a converter to convert a voltage of the electric power received by the power input, and a power supply to supply electric power to the outside through the outbound power output terminal at a voltage based on an output voltage of the converter, the power supply to supply electric power to the outside without exceeding the upper limit determined by the upper limit determiner. Thus, a simple arrangement will enable efficient use of the power supply capacities of the driver and electrical component to supply electric power from the electrical component to the outside.

An electrical component for an electric motor-assisted bicycle according to a preferred embodiment of the present invention includes a power input to receive electric power output from a driver including a motor to be driven by electric power from a battery to generate an assist force, an outbound power output terminal to supply to an outside of the electrical component some of the electric power received by the power input; and an outbound supply power controller configured or programmed to control an upper limit of electric power to be supplied to the outside through the outbound power output terminal based an amount of electric power suppliable by the driver.

The electrical component is mounted on an electric motor-assisted bicycle to provide some functions of the electric motor-assisted bicycle. The electrical component may be, for example, a display, a rider operation device, a wireless communication device, a light (or lamp), or the like. The display may, for example, display or otherwise indicate the state of the electric motor-assisted bicycle and receive input of the rider's operation relating to electric-motor assistance in the electric motor-assisted bicycle.

An electric motor-assisted bicycle including such a system for an electric motor-assisted bicycle is encompassed by the preferred embodiments of the present invention. The electric motor-assisted bicycle may include a torque sensor to detect a pedal force on a pedal, a motor to generate an assist force to be added to the pedal force as assistance, a controller configured or programmed to control the assist force by the motor depending on the pedal force, and a battery to supply the motor with electric power. The driver includes at least the motor and the controller. The controller supplies the electrical component with some of the electric power supplied by the battery. Further, the controller may be configured or programmed to include a communicator to communicate with the electrical component. The communicator of the controller notifies the electrical component of information relating to the amount of electric power suppliable by the driver.

Now, electric motor-assisted bicycles according to preferred embodiments of the present invention will be described with reference to the drawings. In the drawings, the same or corresponding components are labeled with the same reference numerals, and their description will not be repeated. Further, the sizes of the components in the drawings do not exactly represent the sizes of the actual components, the size ratios between the components, or the like. In the description provided below, the directions "front/forward" and "rear(ward)", "left" and "right", and "top/up (ward)" and "bottom/down(ward)" of the electric motor-assisted bicycle refer to such directions as perceived by a rider sitting on the saddle (i.e., seat 28) and gripping the handlebars 23. The directions "front/forward" and "rear (ward)", "left" and "right", and "top/up(ward)" and "bottom/down(ward)" of the electric motor-assisted bicycle are the same as such directions of the vehicle body, i.e., a vehicle body frame of the electric motor-assisted bicycle. Furthermore, the direction of advance of the electric motor-assisted bicycle is the same as the front-rear direction of the electric motor-assisted bicycle. The preferred embodiments described below are merely exemplary, and the present invention is not limited to the preferred embodiments described below.

FIG. 1 is a left side view of an electric motor-assisted bicycle 10 according to a preferred embodiment of the present invention. The characters F, B, U, and D in FIG. 1 indicate forward, rearward, upward, and downward, respectively.

As shown in FIG. 1, the electric motor-assisted bicycle 10 includes a vehicle body frame 51. The vehicle body frame 51 extends in the front-rear direction. A front portion of the vehicle body frame 51 includes a head pipe 51a. The head pipe 51a rotatably supports a steering axle 24. Handlebars 23 are mounted on an upper portion of the steering axle 24 by a stem 25 provided therebetween. A front fork 26 is mounted on the lower end of the steering axle 24 to rotatably support a front wheel 21.

An electrical component 1 is mounted on or near the handlebars 23. The electrical component 1 displays the state of the electric motor-assisted bicycle 10 and receives input of the rider's operation of the electric motor-assisted bicycle 10. The electrical component 1 is mounted on the handlebars 23, stem 25, steering axle 24, or vehicle body frame 51. Thus, the electrical component 1 is visible and operable by the rider.

An external device 80 is detachably mounted on or near the handlebars 23. The external device 80 can be mounted on the handlebars 23, stem 25, steering axle 24, or vehicle body frame 51. The external device 80 is an electronic device. Although not limiting, the external device 80 may be, for example, a device including a computer, such as a cycle computer.

The electric motor-assisted bicycle 10 includes a headlight 27. In the preferred embodiment shown in FIG. 1, the headlight 27 is mounted on the handlebars 23; alternatively, it may be mounted on a location other than the handlebars 23, such as the front fork 26.

A vehicle speed sensor (i.e., speed sensor) 61 is provided on the front fork 26 to detect rotation of the front wheel 21. The vehicle speed sensor 61 includes, for example, a detected element that rotates together with the front wheel 21, and a detecting element fixed to the vehicle body frame 51 to detect rotation of the detected element. The detecting element detects the detected element in a mechanical, magnetic, or optical manner. The vehicle speed sensor 61 may detect rotation of a rotating body other than the front wheel 21 that rotates as the electric motor-assisted bicycle 10 advances, such as the rear wheel 22, motor 41, crankshaft 32, transmission gear, or chain. Further, the electric motor-assisted bicycle 10 may include, in addition to the vehicle speed sensor, a sensor to detect the state of the vehicle. The electric motor-assisted bicycle 10 may include, for example, an angular velocity sensor (e.g., gyro sensor) or an acceleration sensor.

A seat 28 is mounted on the vehicle body frame 51. The rear wheel 22 is located rearward of the seat 28 and rotatably supported by a rear portion of the vehicle body frame 51. The crankshaft 32 is rotatably supported by the vehicle body frame 51. Crank arms 31 and pedals 33 are attached to the crankshaft 32. The electric motor-assisted bicycle 10 includes a transmission mechanism to transmit the rotation of the crankshaft 32 to the rear wheel 22.

A torque sensor 62 is provided around the crankshaft 32 to detect a pedal force applied by the rider. The torque sensor 62 detects torque that rotates the crankshaft 32 about its axis.

The torque sensor 62 may be, for example, a non-contact torque sensor such as a magnetostrictive one, or a contact torque sensor such as an elastic-body variable detection-type one. A magnetostrictive torque sensor includes a magnetostrictive member that produces magnetostrictive effects and receives a rotational force of the crankshaft, and a detection coil that detects a change in magnetic permeability caused by a force from the magnetostrictive member.

A battery 35 and a drive unit 40 are mounted on the vehicle body frame 51. The drive unit 40 is an example of a driver. The battery 35 supplies the drive unit 40 with electric power. The battery 35 is detachable from the vehicle body frame 51. The battery 35 and drive unit 40 are electrically connected with each other by a cable.

The drive unit 40 includes a housing 43 as well as the motor 41 and a control device (not shown in FIG. 1) contained in the housing 43. The motor 41 generates an assist force to be added, as assistance, to the pedal force of the rider. The control device controls the assist force by the motor 41 depending on the pedal force detected by the torque sensor 62. The control device includes, for example, an inverter that controls the motor 41 and a processor that calculates command values for the motor 41, such as a microcontroller unit (MCU) or a microprocessing unit (MPU).

The rotation of the motor 41 is transmitted to the rear wheel 22 via the transmission mechanism. The transmission mechanism includes, for example, a synthesizing mechanism that synthesizes the rotation of the motor 41 and the rotation of the crankshaft 32, and a synthesized-force transmission mechanism that transmits the synthesized force to the rear wheel.

The control device controls input and output of electric power into and from the drive unit 40. The control device supplies the electrical component 1 with some of the electric power supplied by the battery 35. The electrical component 1 and drive unit 40 are electrically connected with each other by a cable. The control device may supply another device, such as a headlight 27, with some of the power from the battery 35. The electrical component 1 is not limited to a component or device that displays information, as in the present preferred embodiment. For example, the headlight 27 or another component or device may be the electrical component 1 that is able to provide electric power to the outside.

The electrical component 1 may be electrically connected, for example, to a sensor included in the electric motor-assisted bicycle 10, such as the vehicle speed sensor 61. The electrical component 1 and sensor may be connected by a cable, or may be wirelessly connected. At least a portion of the cable connected to the electrical component 1 may extend through the interior of the vehicle body frame 51.

Figure 2:
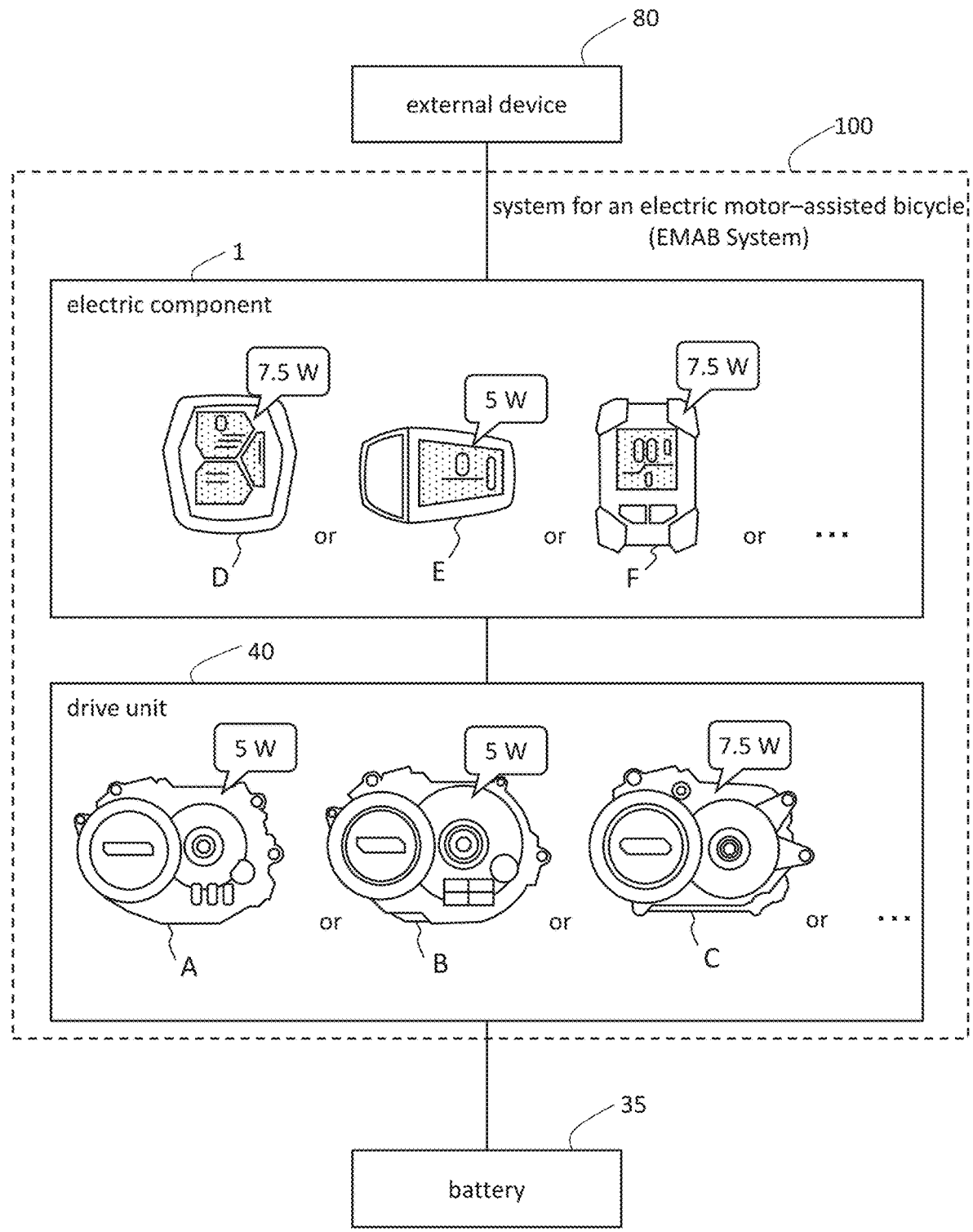
FIG. 2 schematically illustrates a system for an electric motor-assisted bicycle according to a preferred embodiment of the present invention.

FIG. 2 schematically illustrates a system for an electric motor-assisted bicycle (hereinafter referred to as "EMAB system"), 100, according to the present preferred embodiment. As shown in FIG. 2, the EMAB system 100 includes the drive unit 40 and the electrical component 1. The drive unit 40 is supplied with electric power by the battery 35 and supplies some of this power to the electrical component 1. The electrical component 1 is supplied with electric power from the drive unit 40 and supplies some of this power to an external device 80. The EMAB system 100 is an outbound power supply system in an electric motor-assisted bicycle.

This arrangement enables the electrical component 1 to supply the external device 80 with electric power while the rider is using the external device 80 that is located so as to be easy to observe and operate. Further, it requires no additional cables to supply the external device 80 with electric power. Power supply to the external device 80 is made possible with reduced additional equipment and with a simple arrangement.

In such a system as shown in FIG. 2, the drive unit 40 may be one of a plurality of device types, A, B, C, and so on, and the electrical component 1 may be one of a plurality of device types, D, E, F, and so on. That is, various device type combinations can be used to implement the combination of the drive unit 40 and the electrical component 1. For each of the drive unit 40 and electrical component 1, the maximum amount of electric power that can be supplied to the outside is determined by specifications, and the maximum amount of power varies depending on the device type. Thus, with some combinations, situations may occur where the system attempts to supply power exceeding the system's upper limit of suppliable power to the outside. Such a situation occurs when, for example, a driver of Type A, with a maximum amount of power of 5 W, is combined with an electrical component of Type D, with a maximum amount of power of 7.5 W. That is, if the electrical component of Type D attempts to supply 7.5 W power to the outside, power supplied by the driver of Type A (i.e., 5 W) is insufficient, which can cause a system failure.

To avoid such a situation, the specification of maximum amount of power suppliable by the electrical component 1 to the outside may be adjusted based on the drive unit 40, which has the smallest maximum amount of power. For example, in the case of FIG. 2, specifications may be made where the maximum amount of power suppliable by the electrical component 1 of every one of Types D, E, and F to the outside is 5 W to be aligned with the driver of Type B, which has the smallest maximum amount of power. In such cases, the power supply capacity of the entire system may not be exploited to the maximum degree. For example, in the case of a combination of Type C and Type F, the electrical component 1 can only supply 5 W due to the specifications, even though the device, if supplied with 7.5 W power by the driver, is capable of supplying 7.5 W power to the outside.

The EMAB system 100 of the present preferred embodiment allows a free combination of types of electrical components and drivers. Further, the EMAB system 100 of the present preferred embodiment is a power supply system that is able to avoid supplying power over its capacity even while efficiently using its outbound power supply capacity depending on a plurality of type combinations with different maximum amounts of suppliable power. To make this possible, the EMAB system 100 provides the electrical component 1 with an arrangement to control the upper limit of electric power to be supplied by the electrical component 1 to the outside (i.e., a maximum amount of suppliable power) based on the maximum amount of power suppliable by the drive unit 40.

Figure 3:
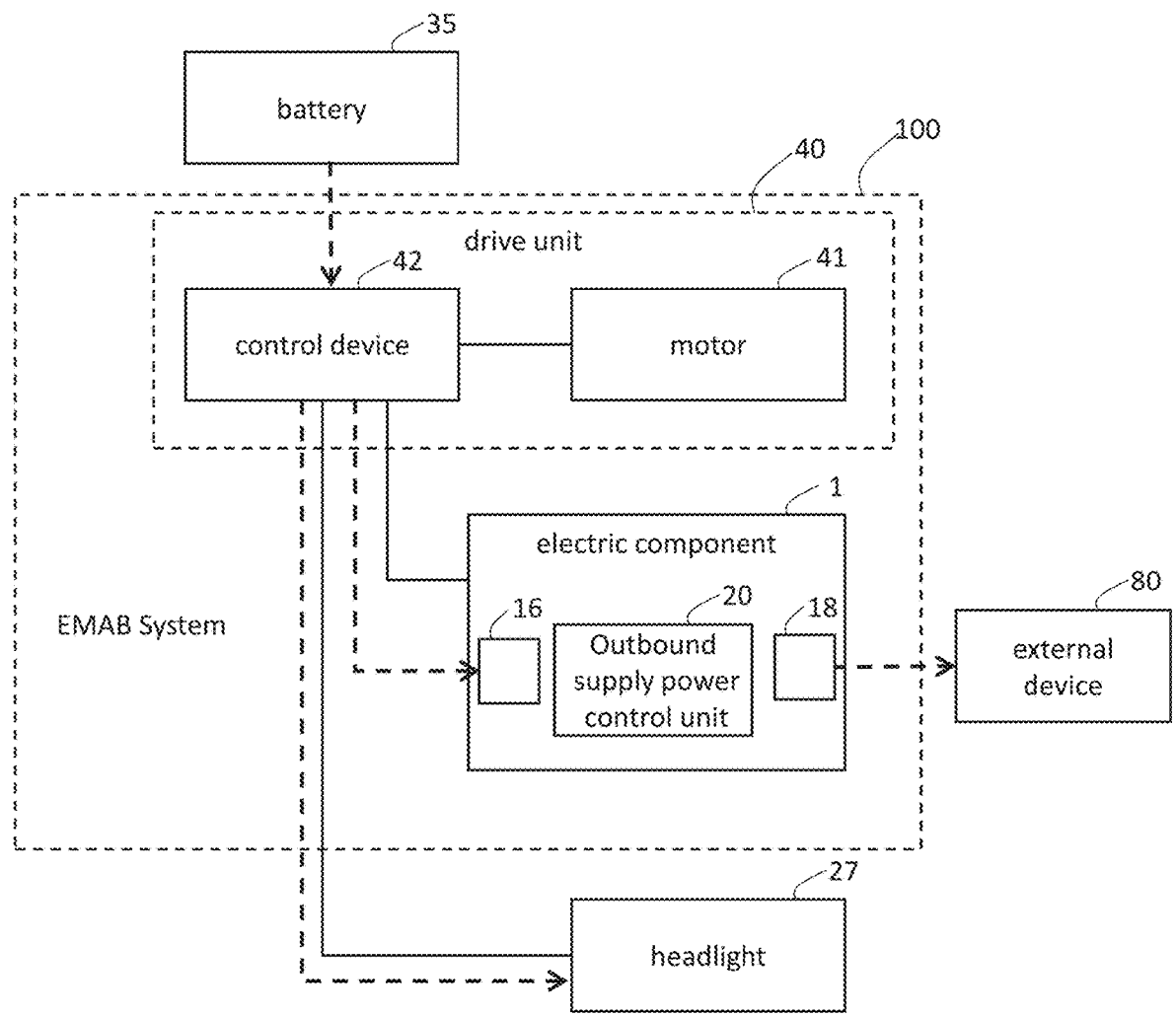
FIG. 3 is a functional block diagram illustrating an exemplary configuration of the system for an electric motor-assisted bicycle.

FIG. 3 is a functional block diagram illustrating an exemplary configuration of the EMAB system 100. In the preferred embodiment shown in FIG. 3, the drive unit 40 includes the motor 41 and the control device 42. The control device 42 is configured or programmed to supply the motor 41 with some of the electric power supplied by the battery 35 and supply the electrical component 1 with some other amount of electric power.

The control device 42 may include, for example, an MCU and a converter. The MCU performs operations for various kinds of controls. The converter converts the voltage of the battery 35 to a voltage to supply to the motor 41 and a voltage to supply to the outside, for example.

The control device 42 regulates electric power to be supplied to the motor 41 and electric power to be supplied to the outside. The control device 42 determines an upper limit of electric power (i.e., maximum amount of power) suppliable by the drive unit 40 to the outside, i.e., electrical component 1. This maximum amount of power suppliable to the outside may be, for example, a predetermined value, or a maximum amount of power may be determined depending on the state of the electric motor-assisted bicycle 10.

The control device 42 may determine a maximum amount of power suppliable to the electrical component 1 based on the use condition of electric power from the battery 35 in the drive unit 40. The MCU of the control device 42 is able to allocate electric current for supply to the motor 41 and for supply to the outside. For example, the MCU may determine a current allocated to the motor 41 below a level obtained by subtracting the current consumed by the components other than the motor 41 from the maximum current that can be output by the battery 35.

The control device 42 may include a communication unit to exchange information with the electrical component 1. The control device 42 notifies the electrical component 1, via the communication unit, of the upper limit of power (i.e., maximum amount of power) that can be supplied by the drive unit 40. The control device 42 may notify the electrical component 1 of the maximum amount of power suppliable by the drive unit 40 at a predetermined period or at a point of time where maximum power is updated. Alternatively, the control device 42 may notify the electrical component 1 of the maximum amount of suppliable power upon reception of a request from the electrical component.

The electrical component 1 communicates with the control device 42 to acquire information indicative of the maximum amount of power suppliable by the drive unit 40. Based on the maximum amount of power suppliable by the drive unit 40 acquired from the control device 42, the electrical component 1 controls the upper limit of power (i.e., maximum amount of power) suppliable by the electrical component 1 to the outside. The electrical component 1 includes a power input unit 16, an outbound power output terminal 19, and an outbound supply power control unit 20. The power input unit 16 is an example of a power input. The power input unit 16 receives electric power output from the drive unit 40. Some of the electric power received by the power input unit 16 is supplied to the outside through the outbound power output terminal 19. The outbound supply power control unit 20 is an example of an outbound supply power controller. The outbound supply power control unit 20 controls an upper limit of electric power to be supplied to the outside through the outbound power output terminal 19 based on an amount of electric power suppliable by the drive unit 40.

In the preferred embodiment shown in FIG. 3, the control device 42 controls the headlight 27. For example, the control device 42 may receive, from the electrical component 1, information about the rider's on/off operation of the headlight 27 and, based on this information, control the headlight 27 between on and off.

Moreover, the control device 42 may transmit information to be displayed to the electrical component 1 via the communication unit. Further, the control device 42 may receive information about an operation input by the rider from the electrical component 1 via the communication unit. The communication unit may be, for example, an MCU and other circuitry. Furthermore, the control device 42 may be able to communicate with on-board equipment other than the electrical component 1, such as the battery 35 or a sensor.

Figure 4:
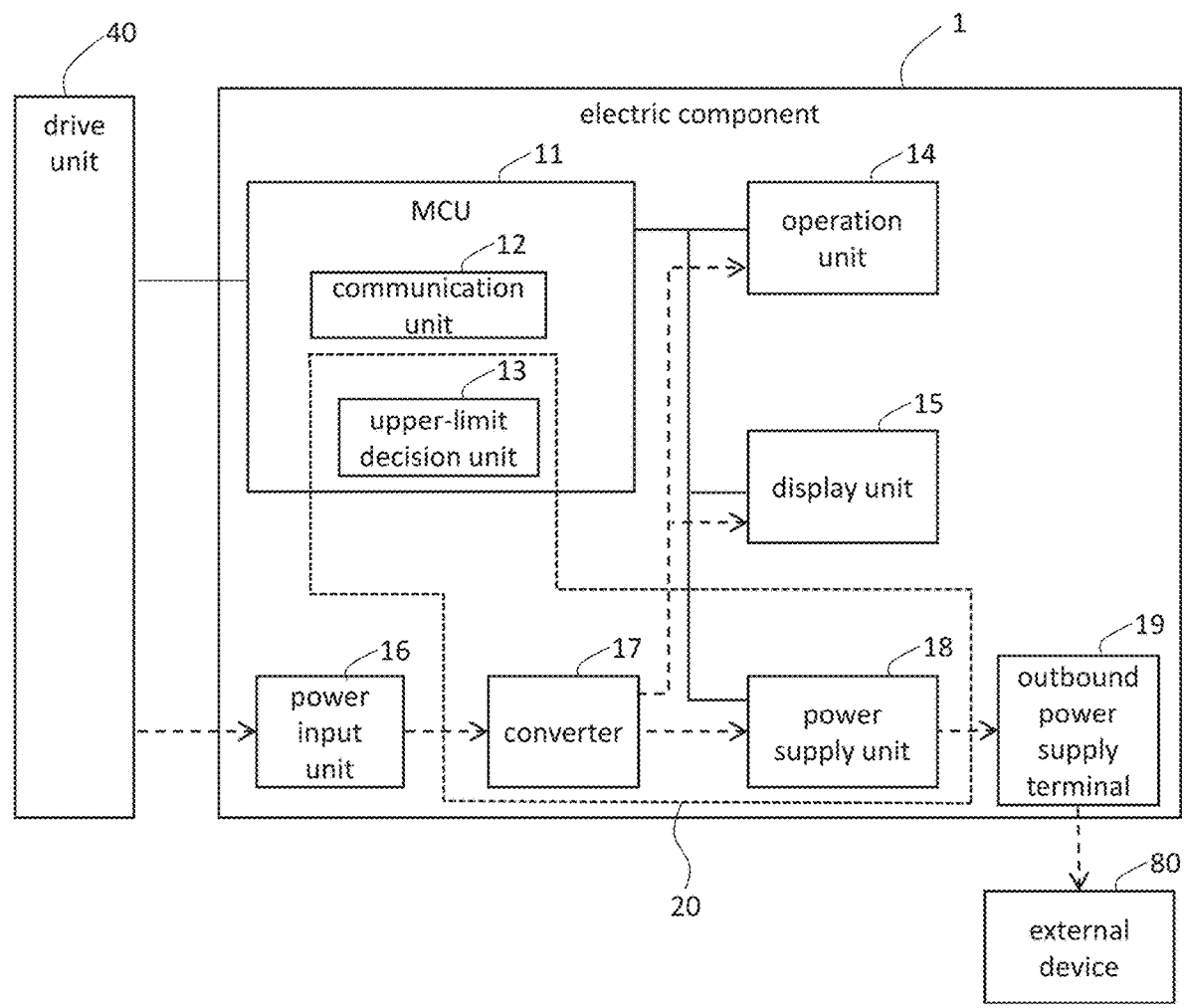
FIG. 4 is a functional block diagram illustrating an exemplary configuration of the electrical component shown in FIG. 3.

FIG. 4 is a functional block diagram illustrating an exemplary configuration of the electrical component 1 shown in FIG. 3. In the preferred embodiment shown in FIG. 4, the electrical component 1 includes an MCU 11 (including a communication unit 12 and an upper limit decision unit 13), a rider operation unit 14, a display unit 15, a power input unit 16, a converter 17, a power supply unit 18, and an outbound power output terminal 19. The upper limit decision unit 13, converter 17, and power supply unit 18 together are an example of the outbound supply power control unit. In FIG. 4, a broken arrow indicates a flow of electric current.

The communication unit 12 communicates with the drive unit 40. The communication unit 12 is an example of a driver communicator. The communication unit 12 exchanges data with the control device 42 of the drive unit 40. The upper limit decision unit 13 determines on an upper limit of power (i.e., maximum amount of power) suppliable by the electrical component 1 to the outside based on information about the maximum amount of power suppliable by the drive unit 40 which has been received through the communication unit 12. The upper limit decision unit 13 is an example of an upper limit determiner.

The power input unit 16 provides for input of electric power output from the drive unit 40. The power input unit 16 is an interface that receives electric power from the drive unit 40. The power input unit 16 may be an input terminal for electric power, for example. The power input unit 16 may be a connector connected to a cable which transmits electric power from the drive unit 40, for example. Alternatively, the power input unit 16 may be a circuit which receives electric power wirelessly.

The outbound power output terminal 19 includes a power source port to which the external device 80 is able to be connected. Although not limiting, the outbound power output terminal 19 may be a USB port, for example. The outbound power output terminal 19 may be a circuit which transmits electric power wirelessly.

The converter 17 converts the voltage of power received by the power input unit 16 and distributes it among the MCU 11, operation unit 14, display unit 15, and power supply unit 18. The converter 17 may operate so that the voltage for the MCU 11 and the voltage for the power supply unit 18 are different from each other. The voltage for the power supply unit 18 provides a basis for the voltage supplied to the outside.

The power supply unit 18 is an example of a power supply. The power supply unit 18 supplies electric power to the outside through the outbound power output terminal 19 at a voltage that is based on the output voltage at the converter 17. The power supply unit 18 supplies power to the outside without exceeding the upper limit determined by the upper limit decision unit 13. That is, the power supply unit 18 supplies the external device with electric power within the maximum amount of power specified by the MCU 11. For example, the power supply unit 18 may operate so that the voltage output from the outbound power output terminal 19 is constant and, when current increases and power reaches the upper limit, lower the voltage. The power supply unit 18 may be a power supply IC, for example. The power supply IC may set an upper limit of electric power by using resistance values, for example.

In the preferred embodiment shown in FIG. 4, the power supplied by the drive unit 40 to the electrical component 1 is not only conveyed to the MCU 11, operation unit 14, and display unit 15, but also through a distinct power supply line for supply to the outside (i.e., to the external device 80). The power supply unit 18 is located on this power supply line.

The power supply unit 18 controls power supply to the external device 80. This arrangement efficiently achieves control of the upper limit of power supplied to the outside.

The operation unit 14 receives the rider's operation relating to functions of the electric motor-assisted bicycle 10 that use electric power. The operation unit 14 may receive, for example, an operation by the rider relating to power-on/power-off of the drive unit 40 of the electric motor-assisted bicycle 10, turning-on/turning-off of the headlight 27, selection of a level of assistance by the motor 41, or selection of a travel mode, among others. The operation unit 14 may include an input, such as a button, a switch, or a touch screen. Alternatively, the operation unit 14 may receive the rider's operation via a switch unit connected to the electrical component 1. The MCU 11 conveys the content of the operation performed on the operation unit 14 to the control device 42 via the communication unit 12.

The display unit 15 displays information relating to the state of the electric motor-assisted bicycle 10 to the rider. The MCU 11 provides the display unit 15 with display instructions based on the data acquired from the control device 42 through communication. The display unit 15 may include a display or a lamp, for example.

The upper limit decision unit 13 of the MCU 11 uses at least the upper limit of power (i.e., maximum amount of power) suppliable by the drive unit 40 acquired from the control device 42 through communication to determine an upper limit of power (i.e., maximum amount of power) suppliable by the electrical component 1 to the outside. Thus, the upper limit of power to be supplied by the electrical component 1 is controlled so as not to exceed the upper limit of power to be supplied by the driver.

Further, the upper limit decision unit 13 uses, in addition to the upper limit of power suppliable by the drive unit 40, a predetermined value of the upper limit of power (i.e., maximum amount of power) suppliable by the electrical component 1 to determine an upper limit of power (i.e., maximum amount of power) suppliable by the electrical component 1 to the outside. The predetermined amount of power suppliable by the electrical component 1 may be, for example, a value determined by specifications which is stored on the MCU in advance. Thus, the upper limit of power to be supplied by the electrical component 1 is controlled so as not to exceed the predetermined upper limit.

Further, the upper limit decision unit 13 may use, in addition to the upper limit of power suppliable by the drive unit 40, a value of the power consumed by the electrical component 1 to determine an upper limit of power (i.e., maximum amount of power) suppliable by the electrical component 1 to the outside. The MCU 11 is able to monitor the power consumption of the electrical component 1. For example, the MCU 11 is able to acquire power consumption based on the electric current and/or voltage measured in the load in the electrical component 1. Thus, the upper limit of electric power to be supplied by the electrical component 1 is controlled so as not to exceed a value obtained by subtracting the power consumption from the upper limit of power to be supplied by the driver. The upper limit of power to be supplied by the electrical component 1 may be a value that does not exceed the value obtained by subtracting the power consumption and the losses occurring in the path from the upper limit of power to be supplied by the driver. The losses may be represented by, for example, a value stored in the electrical component 1 in advance. Alternatively, the MCU 11 may determine the losses based on the electric current and/or voltage measured in the load in the electrical component 1.

Thus, the upper limit decision unit 13 may determine an upper limit using, in addition to the upper limit of power suppliable by the drive unit 40, at least one of a predetermined amount of power suppliable by the electrical component 1 and the power consumption of the electrical component 1. Using all of these, the upper limit decision unit 13 may select, as the upper limit of power to be supplied by the electrical component 1 to the external device 80, the lower one of the maximum amount of power suppliable by the drive unit 40 to the electrical component 1 and the maximum permissible amount of power that can be supplied by the electrical component 1 to the outside.

The electrical component 1 is not limited to the exemplary configuration shown in FIG. 4. Apart from the function of supplying electric power received from the drive unit 40 to the outside, the electrical component 1 has its original functions. In the preferred embodiment shown in FIG. 4, the operation unit 14 and display unit 15 are exemplary functional units that implement the original functions of the electrical component 1. Other functional units for original functions of the electrical component 1 include, for example, a wireless communication device that wirelessly communicates with the outside, a light, or a cycle computer.

Further, both the original functional units of the electrical component 1 and the outbound power supply function need not always operate at the same time. For example, the electrical component 1 may permit the original functions of the electrical component 1 to be halted and the outbound power supply to operate.

Further, in the preferred embodiment of FIG. 4, the outbound supply power control unit includes the upper limit decision unit 13, converter 17, and power supply unit 18. The outbound supply power control unit is not limited to this configuration. For example, the converter may be replaced by an electrical distributor. The outbound supply power control unit may include a circuit, a computer (e.g., processor) or combination thereof. Further, the arrangement that enables the electrical component 1 to acquire information indicating an upper limit of electric power suppliable by the drive unit 40 is not necessarily limited to communication with the drive unit 40. For example, the electrical component 1 may acquire information indicating an upper limit of power suppliable by the drive unit 40 by receiving input by the rider or communicating with a terminal other than the drive unit 40.

Figure 5:
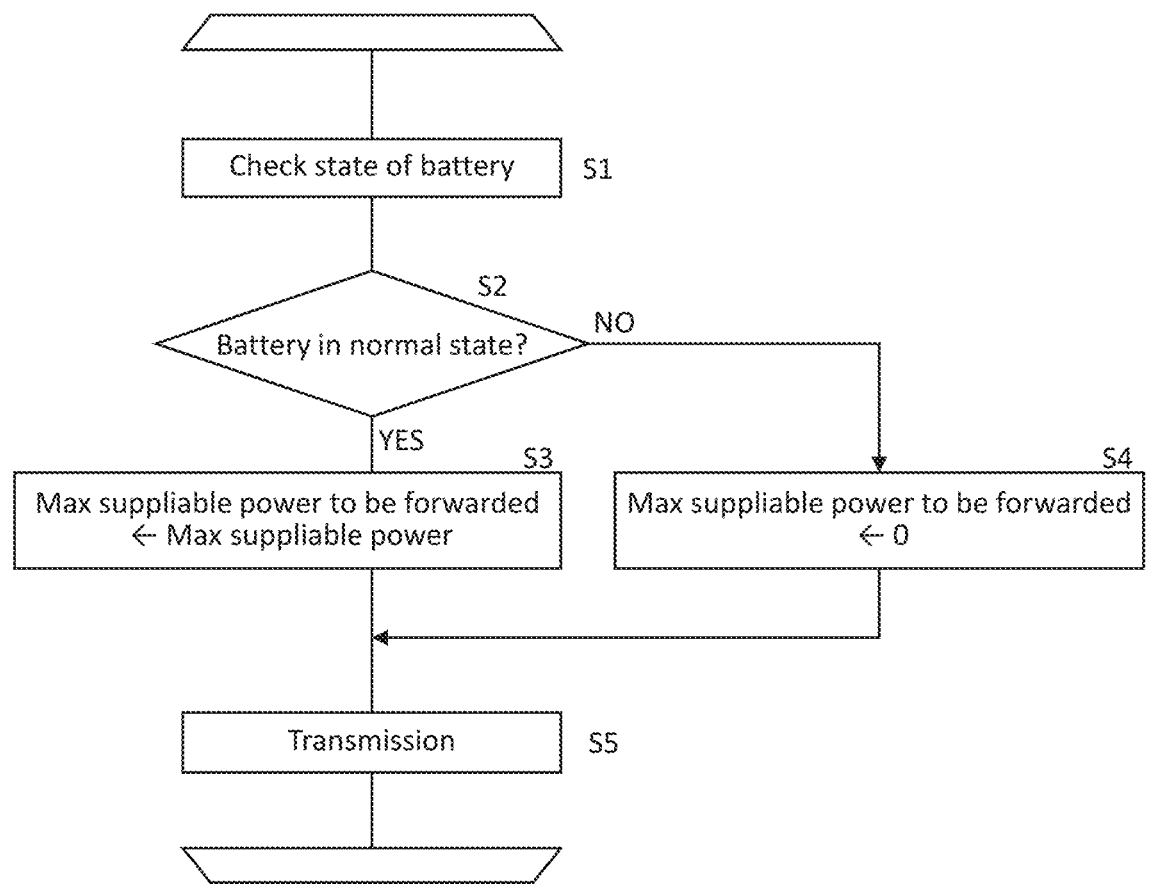
FIG. 5 is a flow chart illustrating an exemplary information notification process by a controller.

FIG. 5 is a flow chart illustrating an exemplary information notification process by the control device 42 for the electrical component 1. Referring to FIG. 5, at step S1, the control device 42 of the drive unit 40 checks the state of the battery 35. The control device 42 may acquire information indicating the state of the battery 35 through communication with the battery 35, for example.

At step S2, the control device 42 determines whether the battery 35 is in a normal state. If so, the control device 42 uses the maximum amount of suppliable power (i.e., maximum possible output power) that has been determined in advance in the drive unit 40 as the value to be forwarded to the electrical component 1 (S3). The predetermined maximum amount of suppliable power may be, for example, a value determined by specifications which is stored on the control device 42 in advance.

If the control device 42 has determined that the battery 35 is in an abnormal state (NO at step S2), the device uses zero as the value of the maximum suppliable power to be forwarded (S4). The control device 42 transmits, to the electrical component 1, the value determined at step S3 or S4 as the value of the maximum amount of power suppliable to the electrical component 1.

The process shown in FIG. 5 is periodically performed. Thus, the control device 42 is able to periodically notify the electrical component 1 of the upper limit of power suppliable by the drive unit 40 (i.e., maximum amount of power). Thus, the maximum amount of suppliable power that is forwarded varies dynamically depending on the state of the battery 35 (i.e., normal or abnormal). This allows the electrical component 1 to acquire information about the suitable maximum amount of power that depends on the state of the battery 35.

The result of the check of the battery 35 is not limited to normal/abnormal shown in at step S2; other states may be determined. Further, the maximum amount of suppliable power that is forwarded is not limited to the values shown in FIG. 5, and other values may be taken. Further, in addition to, or in lieu of, the check of the battery state at step S1, other states relating to electric power may be checked. Furthermore, the notification process shown in FIG. 5 may be performed when the state of the battery or other power-related states have changed, instead of periodically.

Figure 6:
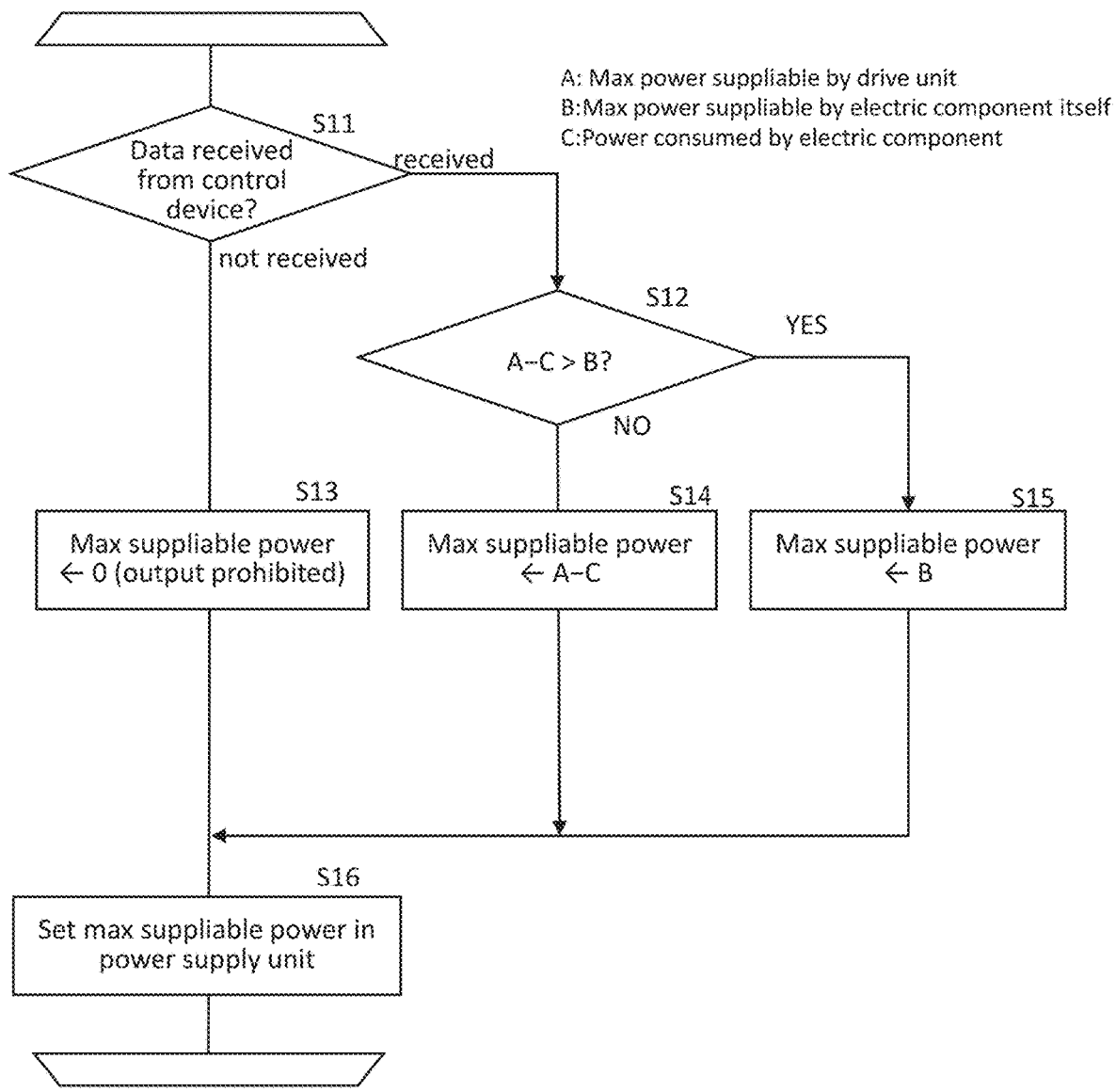
FIG. 6 is a flow chart illustrating an exemplary process by the electrical component.

FIG. 6 is a flow chart illustrating an exemplary process by the electrical component 1 to determine an upper limit of electric power suppliable to the outside. Referring to FIG. 6, at step S11, the MCU 11 of the electrical component 1 determines whether it has received data from the control device 42. If not, it uses zero as the upper limit of power suppliable to the outside (i.e., maximum amount of power). That is, it prohibits outbound power supply.

If the MCU 11 has determined at step S11 that data has been received, the MCU determines whether A−C>B (S12), where A is the maximum amount of power suppliable by the drive unit 40, B is the predetermined value of the maximum amount of power suppliable by the electrical component 1, and C is the power consumption of the electrical component 1. If "NO" at step S12, the MCU determines to use the value of A−C as the upper limit of power suppliable to the outside (S14). If "YES" at step S12, the MCU determines to use the value of B as the upper limit of power suppliable to the outside (S15). Thus, the MCU determines to use, as the upper limit of power suppliable by the electrical component 1 to the outside, the lower one of the maximum amount of power suppliable by the drive unit 40 to the electrical component 1 and the permissible maximum amount of power suppliable by the electrical component 1 to the outside.

The MCU 11 sets the value of the maximum suppliable power determined at one of steps S13 to S15 in the power supply unit 18 (S16). The power supply unit 18 supplies electric power to the outside, where the set value defines the upper limit. The process described above allows the electrical component 1 to appropriately switch between different upper limits of power to be supplied to the outside depending on the amount of power suppliable by the drive unit 40, the amount of power suppliable by the electrical component 1, and the amount of power consumed by the electrical component 1. This makes it possible to avoid providing a supply of electric power exceeding the device's capacity while exploiting its outbound power supply capacity to the maximum degree depending on the combination of the types of the drive unit 40 and the electrical component 1.

The electrical component 1 may perform, for example at a predetermined period, the process to determine an upper limit of power suppliable to the outside, shown in FIG. 6. Alternatively, the process to determine an upper limit may be performed when the electrical component is connected to the drive unit 40, when the upper limit of electric power suppliable by the drive unit 40 is updated, or when a change in the power consumption of the electrical component 1 is detected, for example.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A system for an electric motor-assisted bicycle, the system comprising:
   a driver including a motor to be driven by electric power from a battery to generate an assist force; and
   an electrical component connected to the driver and using electric power from the driver for operation, the electrical component including:
   a power input to receive the electric power output from the driver;
   an outbound power output terminal to supply some of the electric power received by the power input to an outside of the electrical component; and
   an outbound supply power controller configured or programmed to control an upper limit of the electric power to be supplied to the outside through the outbound power output terminal based on an amount of electric power suppliable by the driver; wherein
   the driver is connected to the electric power between the battery and the electrical component.

2. The system according to claim 1, wherein the outbound supply power controller is configured or programmed to control the upper limit of electric power to be supplied to the outside based on a power consumption of the electrical component.

3. The system according to claim 1, wherein the outbound supply power controller is configured or programmed to control the upper limit of electric power to be supplied to the outside based on a predetermined amount of electric power suppliable by the electrical component.

4. The system according to claim 1, wherein the outbound supply power controller is configured or programmed to include:
   an upper limit determiner to determine an upper limit of electric power to be supplied through the outbound power output terminal to the outside based on the amount of electric power suppliable by the driver;
   a converter to convert a voltage of the electric power received by the power input; and
   a power supply to supply electric power to the outside through the outbound power output terminal at a voltage based on an output voltage of the converter without exceeding the upper limit determined by the upper limit determiner.

5. A system for an electric motor-assisted bicycle, the system comprising:
   a driver including a motor to be driven by electric power from a battery to generate an assist force; and
   an electrical component connected to the driver and using electric power from the driver for operation, the electrical component including:
   a power input to receive the electric power output from the driver;
   an outbound power output terminal to supply some of the electric power received by the power input to an outside of the electrical component; and an outbound supply power controller configured or programmed to control an upper limit of the electric power to be supplied to the outside through the outbound power output terminal based on an amount of electric power suppliable by the driver; wherein the electrical component includes a driver communicator to communicate with the driver; and the outbound supply power controller is configured or programmed to control the upper limit of electric power to be supplied to the outside based on the amount of electric power suppliable by the driver acquired via the driver communicator.

6. An electrical component for an electric motor-assisted bicycle, the electrical component comprising:
   a power input to receive electric power output from a driver including a motor to be driven by electric power from a battery to generate an assist force;
   an outbound power output terminal to supply some of the electric power received by the power input to an outside of the electrical component; and
   an outbound supply power controller configured or programmed to control an upper limit of electric power to be supplied to the outside through the outbound power output terminal based an amount of electric power suppliable by the driver; wherein
   the electrical component is a display, a rider operation device, a wireless communication device, a light or lamp, or a cycle computer.

7. An electric motor-assisted bicycle including a system for the electric motor-assisted bicycle, the electric motor-assisted bicycle comprising:
   a driver including a motor to be driven by electric power from a battery to generate an assist force; and
   an electrical component connected to the driver and using electric power from the driver for operation, the electrical component including:
      a power input to receive electric power output from the driver;
      an outbound power output terminal to supply some of the electric power received by the power input to an outside of the electrical component; and
      an outbound supply power controller configured or programmed to control an upper limit of electric power to be supplied to the outside through the outbound power output terminal based on an amount of electric power suppliable by the driver.

* * * * *